(12) United States Patent
Potu et al.

(10) Patent No.: US 11,734,324 B2
(45) Date of Patent: *Aug. 22, 2023

(54) SYSTEMS AND METHODS FOR HIGH EFFICIENCY DATA QUERYING

(71) Applicant: Walmart Apollo, LLC, Bentonville, AR (US)

(72) Inventors: Shiva K. Potu, Milpitas, CA (US); Madhavan Kandhadai Vasantham, Dublin, CA (US); Srinivasan Venkatesan, San Jose, CA (US); Yashwanth Thumallapalle, Milpitas, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/233,218

(22) Filed: Apr. 16, 2021

(65) Prior Publication Data

US 2021/0232611 A1 Jul. 29, 2021

Related U.S. Application Data

(63) Continuation of application No. 15/879,407, filed on Jan. 24, 2018, now Pat. No. 11,003,699.

(51) Int. Cl.
| | |
|---|---|
| *G06F 16/00* | (2019.01) |
| *G06F 16/33* | (2019.01) |
| *G06F 16/31* | (2019.01) |
| *G06F 16/38* | (2019.01) |
| *G06F 16/93* | (2019.01) |
| *G06F 40/205* | (2020.01) |

(52) U.S. Cl.
CPC .......... *G06F 16/334* (2019.01); *G06F 16/31* (2019.01); *G06F 16/38* (2019.01); *G06F 16/93* (2019.01); *G06F 40/205* (2020.01)

(58) Field of Classification Search
CPC ........ G06F 16/334; G06F 16/38; G06F 16/93; G06F 16/31; G06F 40/205
USPC .................................................. 707/600–899
See application file for complete search history.

(56) References Cited

U.S. PATENT DOCUMENTS

| | | |
|---|---|---|
| 8,001,127 B2 | 8/2011 | Chandrasekar et al. |
| 8,255,394 B2 | 8/2012 | Branigan et al. |
| 10,282,369 B2 | 5/2019 | Paris et al. |
| 10,592,546 B2 | 3/2020 | Schwartz et al. |
| 10,733,256 B2 * | 8/2020 | Fickenscher .......... G06F 16/248 |

(Continued)

*Primary Examiner* — Michelle N Owyang
(74) *Attorney, Agent, or Firm* — Morgan, Lewis & Bockius LLP; Manita Rawat

(57) ABSTRACT

The embodiments described herein enable the efficient storage and searching of large amounts of data to retrieve desired data with high accuracy and fast response time. The embodiments include for example parsing an input document containing input data into multiple sub-documents based on the structure of the input document and generating for each sub-document, a unique ID, pathway, and metadata. The embodiments also include storage of the ID and pathway for each sub-document in an index database and storage of the input document itself in a separate database. When a query for information from the input document is received, the ID and pathway of the sub document containing the queried information are identified and used to locate the queried information from the input document.

12 Claims, 5 Drawing Sheets

(56) References Cited

U.S. PATENT DOCUMENTS

| | | |
|---|---|---|
| 2004/0221229 A1 | 11/2004 | Perry |
| 2006/0184566 A1 | 8/2006 | Lo et al. |
| 2008/0091693 A1* | 4/2008 | Murthy .................. G06F 16/94 |
| 2010/0169354 A1 | 7/2010 | Baby et al. |
| 2010/0185683 A1* | 7/2010 | Baby ....................... G06F 16/81 |
| | | 707/E17.017 |
| 2013/0151492 A1 | 7/2013 | Kirihata et al. |
| 2013/0173917 A1 | 7/2013 | Clifton et al. |
| 2013/0226876 A1* | 8/2013 | Gati ...................... G06F 16/184 |
| | | 707/652 |
| 2016/0232204 A1* | 8/2016 | Zholudev ............ G06F 3/04842 |
| 2016/0267114 A1* | 9/2016 | Kamekawa ............. G06F 16/22 |
| 2017/0060856 A1 | 3/2017 | Turtle et al. |

\* cited by examiner

SYSTEMS AND METHODS FOR HIGH EFFICIENCY DATA QUERYING

CROSS-REFERENCE TO RELATED APPLICATIONS

This application is a Continuation Application of, and claims priority to, U.S. patent application Ser. No. 15/879,407 filed Jan. 24, 2018, which is herein incorporated by reference in its entirety.

TECHNICAL FIELD

This application relates generally to database systems and, more particularly, relates to optimizing the storage and querying of data in a database system.

BACKGROUND

At least some known database systems can store and manage relatively large amounts of data. In addition, such database systems can provide a means to search through large amounts of data and return specific data in response to a query. For example, in a retail management database, input data corresponding to an order of clothing may be received. The input data may include hundreds or even thousands of attributes, such as types of clothing ordered, amounts of each type, colors, sizes, and shipping information, among others. A user engaged in data analytics may wish to know how many red shirts were included in an order and may need this information quickly. However, at least some known database systems do not have the storage capacity and cannot scale to handle the ever increasing number of orders a system may receive on a daily basis. In addition, data stored in existing database systems includes redundant hierarchies, resulting in a low level of granularity when querying information from the database. Stated differently, accessing specific data at a lower level of the data hierarchy may require a query at a higher level of the hierarchy, thus returning large amounts of extraneous information beyond the information desired. This in turn may also result in longer response times and inefficient use of computational resources.

BRIEF DESCRIPTION OF THE DRAWINGS

Aspects of the present disclosure are best understood from the following detailed description when read with the accompanying figures in which like reference characters refer to the same parts throughout the different views. It is noted that, in accordance with the standard practice in the industry, various features are not drawn to scale and emphasis instead being placed upon illustrating embodiments of the present invention. In fact, the dimensions of the various features may be arbitrarily increased or reduced for clarity of discussion. The scope of the present patent application is not limited to the disclosed embodiments, but also encompasses combinations of the disclosed embodiments, as well as modifications to the disclosed embodiments.

SUMMARY OF THE INVENTION

Figure 1:
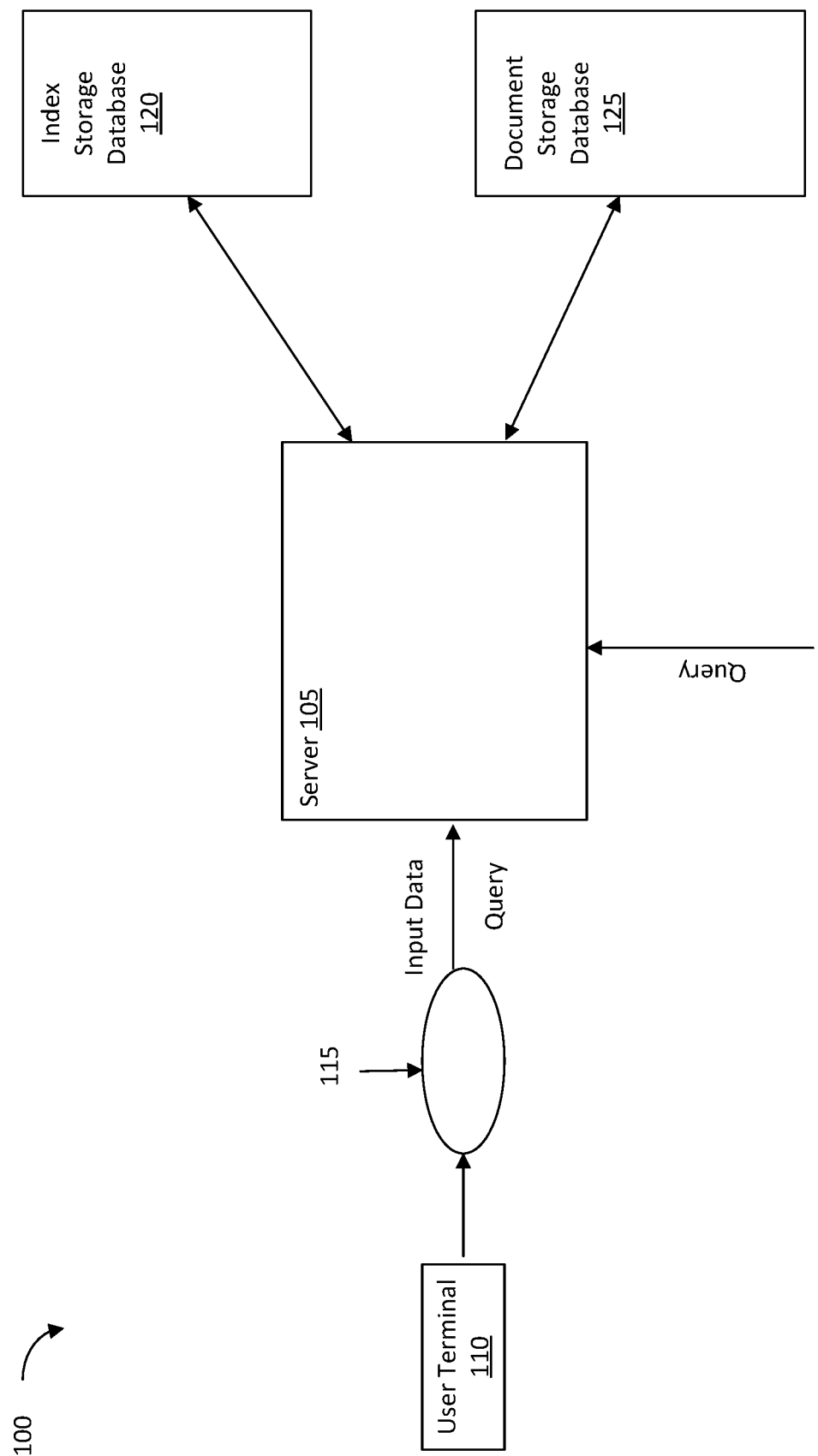
FIG. 1 illustrates an exemplary system in accordance with some embodiments of the present disclosure.

The embodiments described herein enable efficient storage and querying of data. For example, in one embodiment, a system for optimizing data storage and retrieval is disclosed. The system may include a server configured to receive an input document corresponding to a customer order and parse at least one sub document from the input document. The server may further be configured to generate an identifier document and metadata for each of the at least one sub documents, wherein each identifier document comprises a unique ID and pathway of the corresponding sub document. The server may index the at least one identifier document in the index database and persist the metadata locally as well as store the input document in the document database. In response to a query for information from the input document, the server may be configured to determine, based on the query, which of the at least one unique IDs and pathways corresponds to a sub document from which queried information can be accessed and use the determined unique IDs and pathways to extract from the input document, information requested by the query.

In other embodiments, a method for efficiently storing and querying data is disclosed. An input document corresponding to a customer order is received and at least one sub document is parsed from the input document. An identifier document and metadata for each of the at least one sub documents may be generated, wherein each identifier document comprises a unique ID and pathway of the corresponding sub document. The at least one identifier document may be indexed in the index database and the metadata may be persisted locally. The input document may be stored in the document database. In response to a query for information from the input document, at least one unique ID and pathway corresponding to a sub document from which queried information can be accessed may be determined based on the query, and the determined unique IDs and pathways may be used to extract from the input document, information requested by the query.

In yet other embodiments, a non-transitory computer readable medium is disclosed, having instructions stored thereon for efficiently storing and querying data is disclosed. The instructions, when executed by a processor, cause a device to perform operations for such efficient storage and querying. The device may receive an input document corresponding to a customer order and parse at least one sub document from the input document. The device may further generate an identifier document and metadata for each of the at least one sub documents, wherein each identifier document comprises a unique ID and pathway of the corresponding sub document. The device may index the at least one identifier document in the index database and persist the metadata locally as well as store the input document in the document database. In response to a query for information from the input document, the device may determine, based on the query, which of the at least one unique IDs and pathways corresponds to a sub document from which queried information can be accessed and use the determined unique IDs and pathways to extract from the input document, information requested by the query.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The embodiments described herein enable the efficient storage and searching of large amounts of data to retrieve desired data with high accuracy and fast response time. The embodiments include, for example, parsing an input document containing input data into multiple sub-documents based on the structure of the input document, and generating for each sub-document, a unique ID, pathway, and metadata. The embodiments also include storage of the ID and pathway for each sub-document in an index database and storage of the input document itself in a document database. When a query for information from the input document is received, the ID and pathway of the sub document containing the queried information are identified and used to locate the queried information from the input document. Although the embodiments described herein illustrate database search engine systems and methods used for efficient storage and searching of information in a database, the embodiments discussed herein are not limited to such systems and methods and one of ordinary skill in the art will appreciate that the current disclosure may be used in connection with any type of system or method that addresses various different types of database querying problems.

FIG. 1 illustrates a system 100 in accordance with embodiments of the present disclosure. System 100 may include a server 105, a user terminal 110, an index storage database 120, and a document storage database 125. Server 105 may be communicatively coupled to index storage database 120 and document storage database 125. Index storage database 120 may be any high availability, fault tolerant database for indexing data, such as SolrCloud. Document storage database 125 may be any database appropriate for the storage and retrieval of data, such as NoSQL. Index storage database 120 and document storage database 125 may each be implemented as a server including the database and configured to communicate with server 105. As used herein, a document may refer to a set of data that describes something. Therefore, the input data may be referred to as an input document. In some embodiments, server 105 may receive from user terminal 110 an input document corresponding to any relevant set of data. For the purposes of describing the embodiments herein, the input document may represent a customer order for clothing. Server 105 may support input documents in any appropriate data format, such as Java Script Object Notation (JSON), for example. Server 105 may convert received input documents into JSON, or any other appropriate format as necessary. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces.

Server 105, and user terminal 110 may each be a computing device that can be, for example, a server, desktop computer, laptop, mobile device, tablet, thin client, or other device having a communications interface (not shown) that can communicate with other components of system 100, as explained in more detail below with respect to FIG. 2A. In some embodiments, server 105 may be associated with, for example, a retail store, such as a clothing store. For example, server 105 can receive and store data regarding customer orders and allow for the querying and retrieval of such data for reference or analytical purposes.

In some embodiments, user terminal 110, can be accessed by a user to enable the user to communicate with server 105. For example, user terminal 110 can be capable of connecting to, for example, the internet and communicating with server 105 via network 115. The user can use user terminal 110 for communicating an order for goods (e.g. clothing) to the server 105. The user can also use user terminal 110 to communicate queries for information to the server 105. In some embodiments, a user may access the server 105 directly (e.g. via user interface 250 shown in FIG. 2A) and input a query for information to the server 105 directly.

During operation, as explained in more detail below with respect to FIGS. 1, 2, 3, and 4, system 100 can be used to facilitate the efficient querying and retrieval of information from a database, such as information from a customer order. For example, server 105 may receive an input document corresponding to a customer order from user terminal 110 via network 115. Such orders may be received from a variety of locations. Upon receiving an input document from user terminal 110, server 105 may parse one or more sub documents from the input document and store a unique ID and pathway for each sub document in index storage database 120. Server 105 may store the input document in document storage database 125. In response to receiving a query for information from the input document, server 105 may identify the unique ID and pathway for the sub document containing the queried information, and use the unique ID and pathway to locate the queried information from the input document in database storage 125.

Figure 2A:
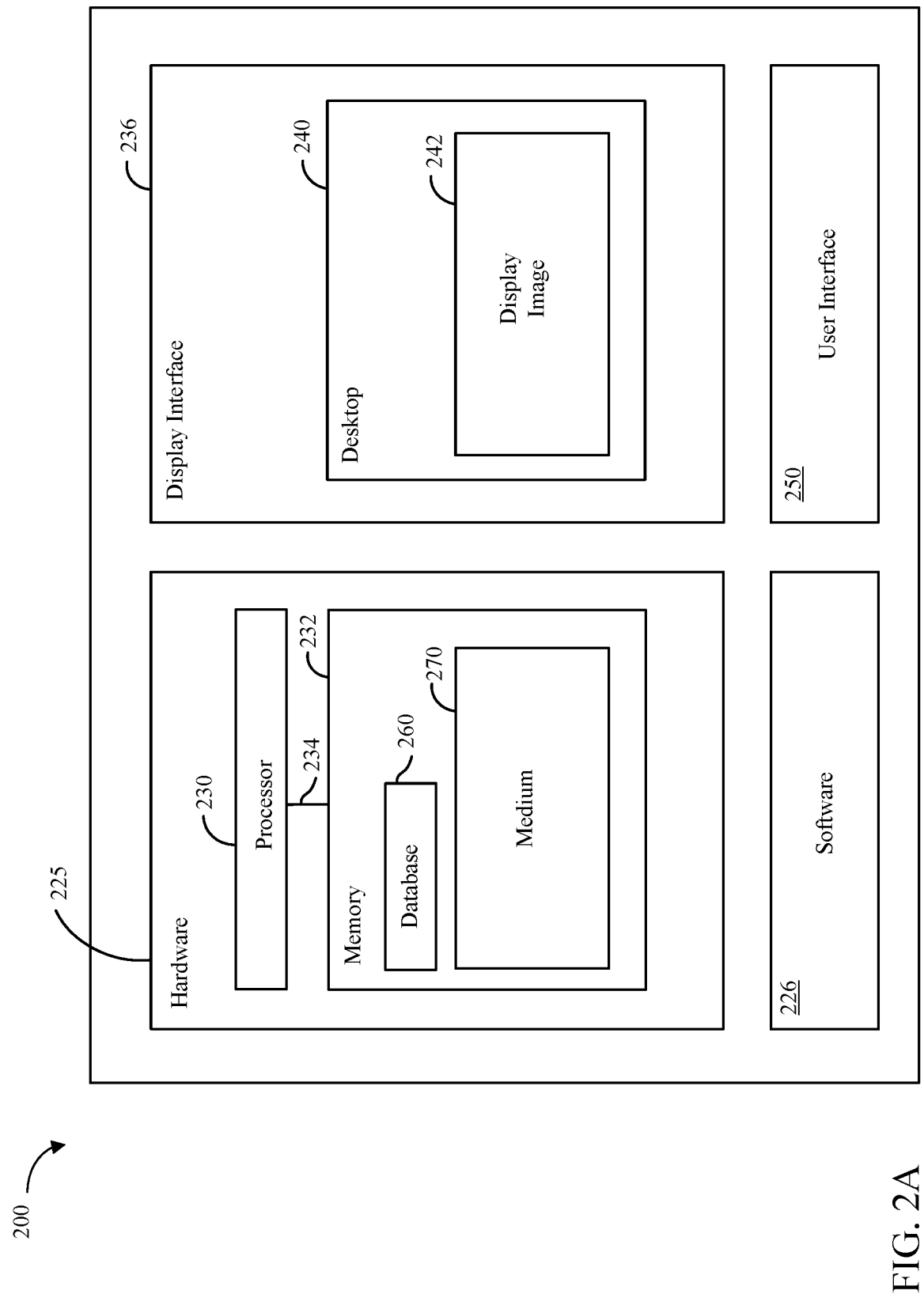
FIG. 2A illustrates an exemplary computing device that may be used with the system shown in FIG. 1, in accordance with some embodiments of the present disclosure.

FIG. 2A is a block diagram of an exemplary computing device 200, which may be used to implement server 105 (shown in FIG. 1). In some embodiments, computing device 200 includes a hardware unit 225 and software 226. Software 226 can run on hardware unit 225 such that various applications or programs can be executed on hardware unit 225 by way of software 226. In some embodiments, the functions of software 226 can be implemented directly in hardware unit 225, e.g., as a system-on-a-chip, firmware, field-programmable gate array ("FPGA"), etc. In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a few GB of RAM. Memory 232 can also be a ROM, a network interface (NIC), and/or other device(s).

In some embodiments, computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 300 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, display image 242 can be presented to a user on computer displays of a remote terminal (not shown). For example, computing device 200 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 300 and the remote terminals or the servers, such that remote end users can access the information from computing device 200.

In some embodiments, computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

Computing device 200, in some embodiments, can include a database 260 within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage media 270 (only one being shown in FIG. 2). Computer storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein, e.g., steps of the process shown in FIG. 4.

Figure 2B:
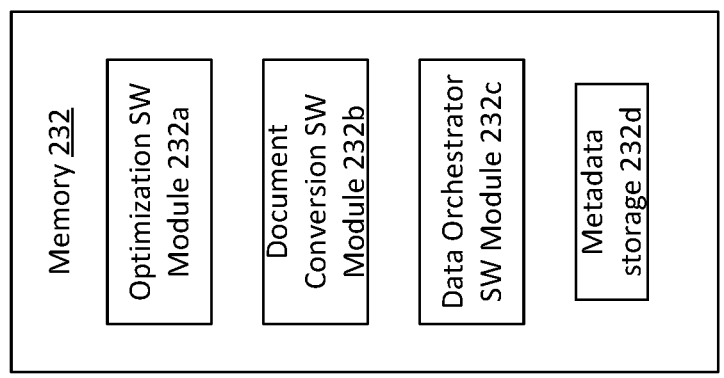
FIG. 2B illustrates an exemplary memory for storing instructions for executing steps of a method that may be used with the system shown in FIG. 1, in accordance with some embodiments of the present disclosure.

FIG. 2B illustrates memory 232 (shown in FIG. 2A) and the various software (SW) modules that may be stored therein. Memory 232 may comprise a non-transitory computer-readable medium (e.g., one or more nonvolatile memory elements, such as EPROM, EEPROM, Flash memory, a hard drive, and so on) that may store at least the following software (SW) modules: (1) an optimization SW module 232a to parse an input document into a plurality of sub-documents and optimize memory space; (2) a document conversion SW module 232b to generate metadata as well as a Solr document including a unique ID and pathway for each sub-document and store each Solr document in the index server 120; (3) a data orchestrator SW module 232c to convert regular query parameters into Solr block join query parameters and optimize the converted queries to reduce filter cache. Subsequently the data orchestrator SW module 232c may extract and filter the data requested by the query from the input document.

As discussed above, an input document may refer to a customer order for clothing. Thus, the input document may contain hundreds of attributes such as types of clothing ordered, amounts of each type, colors, sizes, and shipping information, among others. Each attribute may have a certain relationship to other attributes (e.g. parent/child). These attributes may be represented as objects and arrays within the input document.

Figure 3:
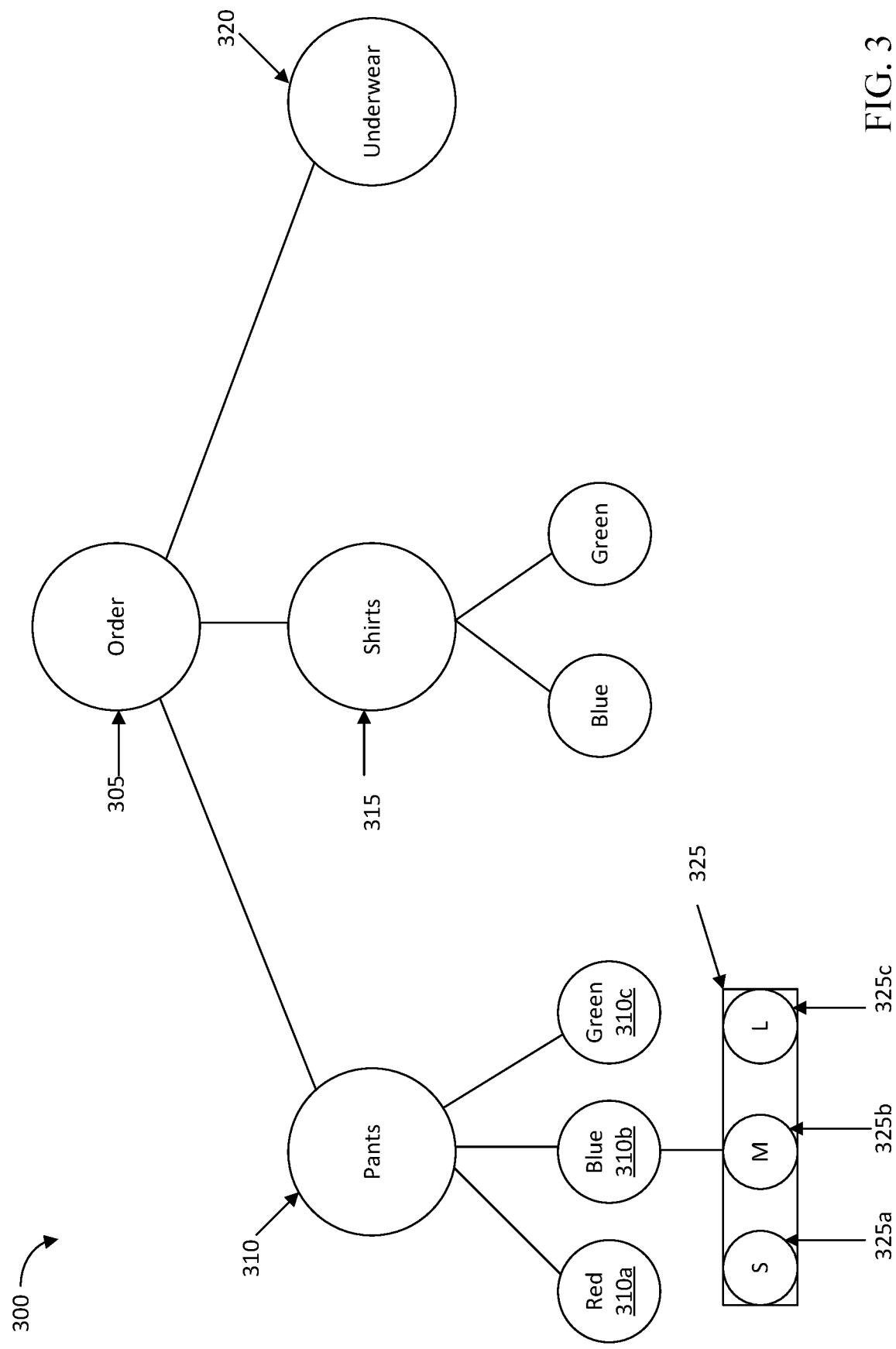
FIG. 3 illustrates an exemplary tree structure diagram of an input document that may be used with the system shown in FIG. 1A, in accordance with some embodiments of the present disclosure.

FIG. 3 illustrates a tree diagram representation of an input document 300. The input document 300 may represent a customer order for clothing, for example. Input document 300 may include a top level object 305, that represents the customer order. Input document 300 may also include objects 310, 315, and 320, which may represent child objects (i.e. sub-objects) of the top level object 305 (i.e. are nested within top level object 305). Objects 310, 315, and 320 may represent pants, shirts, and underwear respectively. Input document 300 may also include objects 310a-c, which may be child objects of object 310. Objects 310a-c may represent the colors of the pants in the order. Further, input document 300 may include array 325, having values 325a-c, each of which represents a size of blue pants in the order. It should be noted that FIG. 3 is illustrated for simplicity, and that input documents may have any appropriate hierarchy with any appropriate number of objects and/or arrays as necessary.

Referring back to FIG. 1, in some embodiments, upon receiving an input document corresponding to, for example, a customer order, server 105 may parse one or more sub-documents from the input document. More specifically, server 105 may identify each value in an array and each object (including sub-objects) in the input document as a sub-document. The sub-document corresponding to an object may include all sub-objects of that object. In addition, each sub-object may be identified as its own sub-document and may include all sub-objects of that sub-object. In this way, server 105 may utilize a bottom up approach to flatten the input document up to the parent level while leaving child arrays as nested objects. Thus, server 105 may eliminate redundant hierarchies in the input document and reduce the number of sub-documents needed.

In the example of FIG. 3, server 105 may identify objects 305, 310, 315, and 320 as objects and create sub-documents for each of them. The sub-document for each of these objects may include all child objects of those objects. For example, server 105 may roll up array 325 (and all of its values) and objects 310a-c into the sub-document corresponding to object 310. Server 105 may further generate separate sub-documents for objects 310a-c as well as all the values 325a-c within array 325.

Referring back to FIG. 1, in some embodiments, upon parsing one or more sub-documents from an input document, server 105 may generate a unique ID, pathway, and metadata for each sub-document. The unique ID and pathway for a sub document, along with the sub document's contents, may constitute an identifier document. Server 105 may then index the identifier document corresponding to each sub document parsed from the input document in the index storage database 120. Although an identity document may be indexed in index storage database 120, only the unique ID and pathway from each identifier document may be stored in the index storage database 120. Thus, index storage database 120 may provide visibility only to the unique ID and pathway of an identifier document. Server 105 may index identifier documents having a parent/child relationship together so as to preserve the relationship. The metadata generated for each sub-document may include a description of what information is stored at the pathway corresponding to that sub-document and may be stored in metadata storage 232d (shown in FIG. 2B). Additionally, server 105 may store the input document itself in the document storage database 125.

In some embodiments, server 105 may identify certain attributes of an identifier document to be ignored when indexing identifier documents. For example, server 105 may identify required attributes such as term vectors and term vector components as attributes of an identifier document to ignore when indexing. In this way, the size of the index in index storage database 120 may remain within the limits of the RAM memory and/or SSD of the index storage database 120.

In some embodiments, in response to receiving a query for information from the input document, server 105 may convert the parameters of the received query into block join query parameters, thus generating a block join query. Server 105 may utilize index storage database 120 as an indexing engine to support use of block join queries. Server 105 may convert the parameters of the query based on the structure of the input document, including its pathways and unique object IDs. Server 105 may then optimize the block join query using the metadata and the structure of the input document in order to reduce filter cache. As discussed above, metadata describes information and where the information is stored, and thus may be used to optimize the query such that only unique IDs and pathways corresponding to sub documents containing data that is relevant to the query are returned.

Upon generating a block join query, server 105 may retrieve the unique ID and pathway of the sub-document(s) corresponding to the data elements (e.g. objects and/or array values) from the input document that houses the information requested. Server 105 may then use the retrieved unique ID and pathway to traverse the input document in document storage database 125 and locate the data elements containing the information requested in the query.

In some embodiments, a query for information may require information from multiple data elements at different levels of the input document's hierarchy. For example, a query may request information from a particular object as well as certain information from a parent object of that particular object. Upon identifying the information required from the parent object using the block join query, server 105 may copy the identified information from the parent object into the particular object and retrieve all the information from the particular object thereafter. In this way, server 105 may eliminate the need to query multiple objects to obtain the necessary data.

Figure 4:
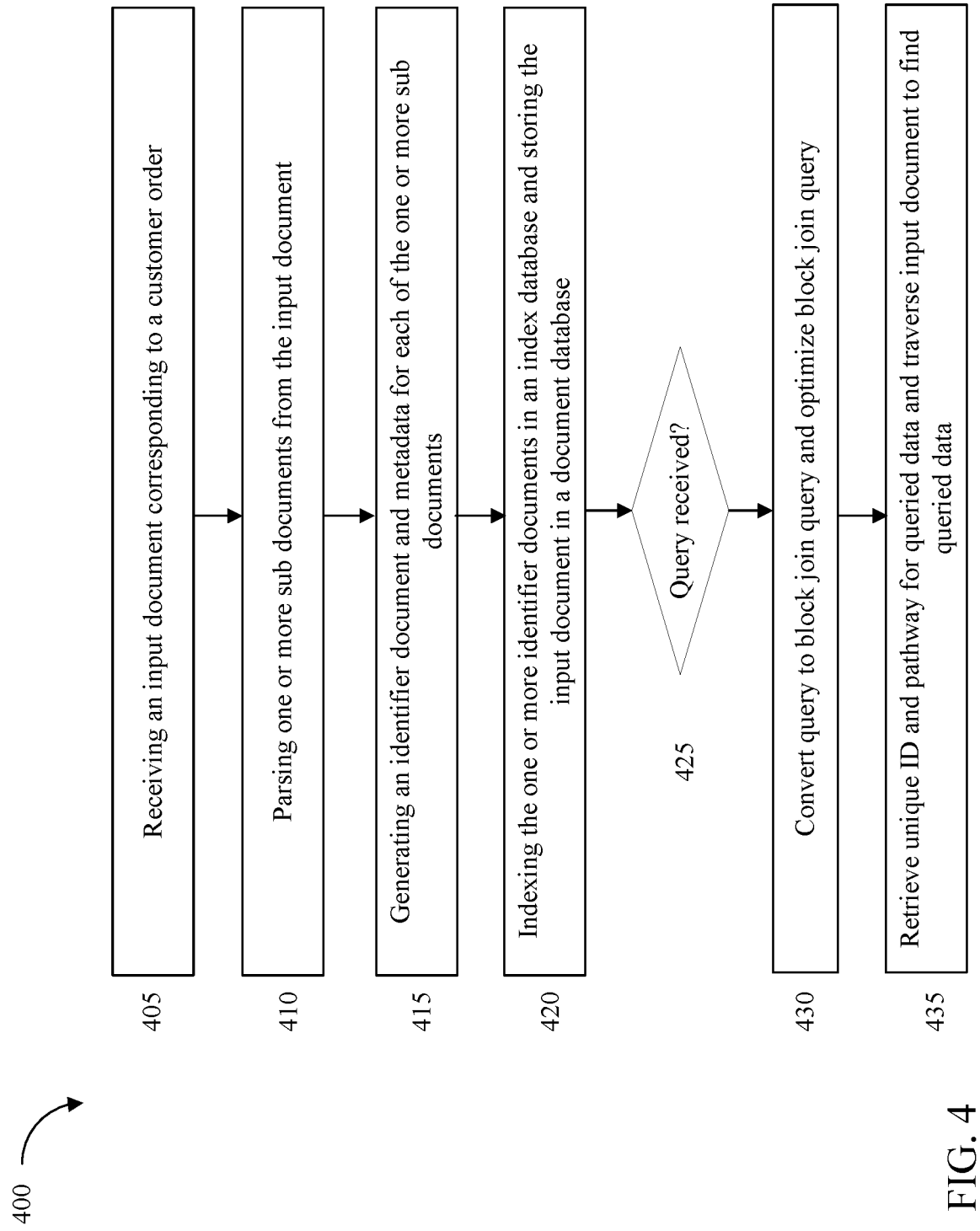
FIG. 4 illustrates a flow diagram of a method for efficient storage and querying of data using the system shown in FIG. 1A, in accordance with some embodiments of the present disclosure.

FIG. 4 illustrates a flow diagram of a method 400, for efficiently storing and searching large amounts of data. Method 400 may be performed by any appropriate system, such as system 100 illustrated in FIG. 1.

At 405, server 105 may receive an input document corresponding to, for example, a customer order. In response to receiving the customer order, at 410 server 105 may parse one or more sub-documents from the input document. More specifically, server 105 may identify each value in an array and each object (including sub-objects) in the input document as a sub-document. The sub-document corresponding to an object may include all sub-objects of that object. In addition, each sub-object may be identified as its own sub-document and may include all sub-objects of that sub-object. In this way, server 105 may utilize a bottom up approach to flatten the input document up to the parent level while leaving child arrays as nested objects. Thus, server 105 may eliminate redundant hierarchies in the input document and reduce the number of sub-documents needed.

At 415, in some embodiments, upon parsing one or more sub-documents from an input document, server 105 may generate a unique ID, pathway, and metadata for each sub-document. The unique ID and pathway for a sub document, along with the sub document's contents, may constitute an identifier document. At 420, server 105 may then index the identifier document corresponding to each sub document parsed from the input document in the index storage database 120. Although an identity document may be indexed in index storage database 120, only the unique ID and pathway from each identifier document may be stored in the index storage database 120. Thus, index storage database 120 may provide visibility only to the unique ID and pathway of an identifier document. Server 105 may index identifier documents having a parent/child relationship together so as to preserve the relationship. The metadata generated for each sub-document may include a description of what information is stored at the pathway corresponding to that sub-document and may be stored in metadata storage 232d (shown in FIG. 2B). Additionally, server 105 may store the input document itself in the document storage database 125.

In some embodiments, server 105 may identify certain attributes of an identifier document to be ignored when indexing identifier documents. For example, server 105 may identify required attributes such as term vectors and term vector components as attributes of an identifier document to ignore when indexing. In this way, the size of the index in index storage database 120 may remain within the limits of the RAM memory and/or SSD of the index storage database 120.

At 425, server 105 may determine whether a query has been received. If so, at 430, server 105 may convert the parameters of the received query into block join query parameters, thus generating a block join query. Server 105 may utilize index storage database 120 as an indexing engine to support use of block join queries. Server 105 may convert the parameters of the query based on the structure of the input document, including its pathways and unique object IDs. Server 105 may then optimize the block join query using the metadata and the structure of the input document in order to reduce filter cache. As discussed above, metadata describes information and where the information is stored, and thus may be used to optimize the query such that only unique IDs and pathways corresponding to sub documents containing data that is relevant to the query are returned.

At 435, upon generating an optimized block join query, server 105 may retrieve the unique ID and pathway of the sub-document(s) corresponding to the data elements (e.g. objects and/or array values) from the input document that houses the information requested. Server 105 may then use the retrieved unique ID and pathway to traverse the input document in document storage database 125 and locate the data elements containing the information requested in the query.

In some embodiments, a query for information may require information from multiple data elements at different levels of the input document's hierarchy. For example, a query may request information from a particular object as well as certain information from a parent object of that particular object. Upon identifying the information required from the parent object using the block join query, server 105 may copy the identified information from the parent object into the particular object and retrieve all the information from the particular object thereafter. In this way, server 105 may eliminate the need to query multiple objects to obtain the necessary data.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising:
a computing device configured to:
receive a plurality of input documents;
in response to receiving each document in the plurality of input documents, generate a plurality of first sub-documents within a database, wherein each of the first sub-documents includes a unique identifier (ID) and unique pathway in the database, wherein the first sub-document corresponds to a first object in a document, and wherein the first sub-document includes identifiers corresponding to each of a plurality of sub-objects of the first object;
in response to generating at least one first sub-document, generate a plurality of second sub-documents within the database, wherein each of the second sub-documents includes a unique ID and unique pathway in the database, wherein each of the second sub-documents corresponds to one of the plurality of sub-objects of the first object;
receive a query comprising at least one query parameter;
determine, based on the at least one query parameter and indexed identifier documents in an index database, one or more responsive unique IDs and pathways corresponding to sub-documents that contain data relevant to the query, and wherein the unique ID and unique pathway of each of the second sub-documents is identifiable independent of the unique ID and unique pathway of the first sub-document; and
retrieve the data relevant to the query from the sub-documents using the one or more responsive unique IDs and pathways.

2. The system of claim 1, wherein at least one document in the plurality of input documents contains data relevant to the query.

3. The system of claim 1, wherein the computing device is further configured to convert the at least one parameter into at least one block join query to generate a block join query.

4. The system of claim 1, wherein the computing device is further configured to generate a plurality of identifier documents each comprising at least one unique ID and pathway.

5. A method comprising:
receiving a plurality of input documents;
in response to receiving each document in the plurality of input documents, generating a plurality of first sub-documents within a database, wherein each of the first sub-documents includes a unique identifier (ID) and unique pathway in the database, wherein the first sub-document corresponds to a first object in a document, and wherein the first sub-document includes identifiers corresponding to each of a plurality of sub-objects of the first object;
in response to generating at least one first sub-document, generating a plurality of second sub-documents within the database, wherein each of the second sub-documents includes a unique ID and unique pathway in the database, wherein each of the second sub-documents corresponds to one of the plurality of sub-objects of the first object;
receiving a query comprising at least one query parameter;
determining, based on the at least one query parameter and indexed identifier documents in an index database, one or more responsive unique identifications (IDs) and pathways corresponding to sub-documents that contain data relevant to the query, and wherein the unique ID and unique pathway of each of the second sub-documents is identifiable independent of the unique ID and unique pathway of the first sub-document; and
retrieving the data relevant to the query from the sub-documents using the one or more responsive unique IDs and pathways.

6. The method of claim 5, wherein at least one document in the plurality of input documents contains data relevant to the query.

7. The method of claim 5, further comprising converting the at least one parameter into at least one block join query to generate a block join query.

8. The method of claim 5, further comprising generating a plurality of identifier documents each comprising at least one unique ID and pathway.

9. A non-transitory computer readable medium having instructions stored thereon, wherein the instructions, when executed by a processor cause a device to perform operations comprising:
receiving a plurality of input documents;
in response to receiving each document in the plurality of input documents, generating a plurality of first sub-documents within a database, wherein each of the first sub-documents includes a unique identifier (ID) and unique pathway in the database, wherein the first sub-document corresponds to a first object in a document, and wherein the first sub-document includes identifiers corresponding to each of a plurality of sub-objects of the first object;
in response to generating at least one first sub-document, generating a plurality of second sub-documents within the database, wherein each of the second sub-documents includes a unique ID and unique pathway in the database, wherein each of the second sub-documents corresponds to one of the plurality of sub-objects of the first object;
receiving a query comprising at least one query parameter;
determining, based on the at least one query parameter and indexed identifier documents in an index database, one or more responsive unique identifications (IDs) and pathways corresponding to sub-documents that contain data relevant to the query, and wherein the unique ID and unique pathway of each of the second sub-documents is identifiable independent of the unique ID and unique pathway of the first sub-document; and
retrieving the data relevant to the query from the sub-documents using the one or more responsive unique IDs and pathways.

10. The non-transitory computer readable medium of claim 9, wherein at least one document in the plurality of input documents contains data relevant to the query.

11. The non-transitory computer readable medium of claim 9, wherein the processor causes the device to perform operations further comprising generating a plurality of identifier documents comprising the one or more responsive unique IDs and pathways.

12. The non-transitory computer readable medium of claim 9, wherein the processor causes the device to perform operations further comprising converting the at least one parameter into at least one block join query to generate a block join query.

* * * * *